(No Model.)
W. X. STEVENS.
INK GRINDING SLAB.
No. 408,143. Patented July 30, 1889.
Fig I.
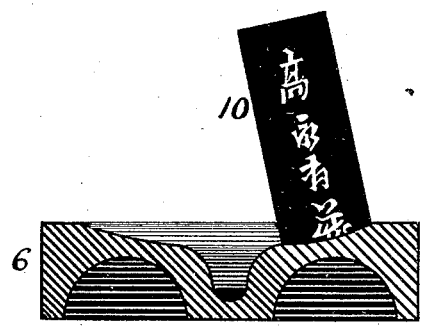
Fig II.
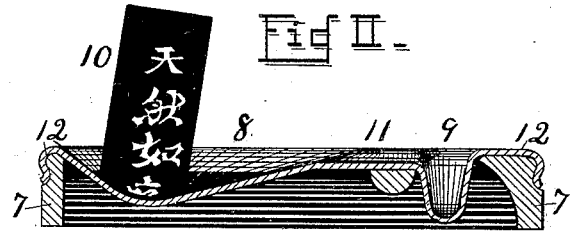
Fig III.
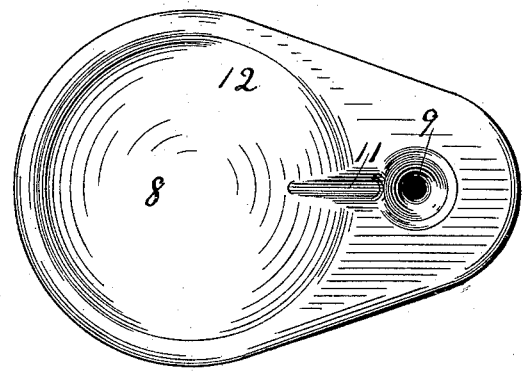
Fig IV.
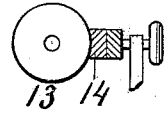
WITNESSES
S. E. E. Stevens
P. E. Stevens.
INVENTOR
William X. Stevens.
N. PETERS, Photo-Lithographer, Washington, D. C.

UNITED STATES PATENT OFFICE.

WILLIAM X. STEVENS, OF WASHINGTON, DISTRICT OF COLUMBIA.

INK-GRINDING SLAB.

SPECIFICATION forming part of Letters Patent No. 408,143, dated July 30, 1889.

Application filed February 1, 1889. Serial No. 298,339. (No model.)

*To all whom it may concern:*

Be it known that I, WILLIAM X. STEVENS, a citizen of the United States, residing at Washington, in the District of Columbia, have invented certain new and useful Improvements in Ink-Grinding Slabs; and I do hereby declare the following to be a full, clear, and exact description of the invention, such as will enable others skilled in the art to which it appertains to make and use the same.

This invention relates to that class of ink-grinding slabs which are used by artists for reducing cake colors to a fluid and by draftsmen for grinding india-ink, &c. Heretofore such grinding has been done by means of hard unyielding slabs of a more or less gritty nature—such as porcelain, glass, slate-stone, &c.—aided by some solvent—such as water—to reduce and maintain the paint or ink in the fluid condition required. In order that india-ink may flow freely from a drafting-pen, particularly when fine and very black lines are required, the ink should be perfectly fluid and entirely free from granular particles; but ink cannot be readily reduced to such a degree of fluidity by merely rubbing the cake upon a rigid slab, and it has heretofore been a common practice among careful draftsmen to first grind a quantity of ink in water on the slab by rubbing the cake thereon and afterward placing the ball of the person's finger in the ink and rubbing it for a considerable time on the slab to reduce the granular particles to fluidity. It has also been common to dip the finger repeatedly in water and rub it directly upon the cake of ink, allowing the ink, when thus reduced to fluid, to drop into a receptacle.

The object of my invention is to provide a grinding surface or surfaces by means of which india-ink and other granular material may be rapidly reduced to a fluid condition, free from granular particles, or by which the particles are attenuated to extreme fineness.

To this end my invention consists in a yielding, elastic, or flexible cushion-like grinding-surface, as hereinafter described and claimed, reference being had to the accompanying drawings, in which—

Figure I is a vertical section of my ink-slab in an ordinary form. Fig. II is a vertical section of my ink-slab in its preferred form, and Fig. III is a top view of the same. Fig. IV shows a suggestion of one of the many uses to which my elastic cushion-like grinding-surface may be adapted.

6 represents the body of the grinding-slab, which I make of soft rubber or some similar elastic or flexible cushion-like yielding material, and for the purpose at present in consideration such cushion-like material should also be non-porous or impervious to water, so that ink or other material to be ground therein may not soak into it nor pass through it. Soft rubber having layers of cloth interposed to strengthen it is found to answer well, and whether it shall be made thick or thin depends upon the form of the slab to be made.

Fig. I shows a solid slab of a single material, and, so far as at present known, that material should be some one of the forms of gum known as "soft rubber."

Fig. II shows an annular frame 7, adapted to support a sheet or cloth 12 of flexible material impervious to water or to the material to be ground in it, shaped into two dishes 8 and 9. The dish 8 is for the purpose of grinding the india-ink or other cake paint 10, and the dish 9 is an ink-well connected with the dish 8 by a passage 11, whose bottom is much above the bottoms of the well 9 and the grinding-dish 8.

When a cake is pressed upon the slab 6, Fig. I, the surface of the slab yields, and is indented so as to fit closely upon the end of the cake, thus rubbing upon the whole end surface of the cake and removing therefrom the ink as fast as it is dissolved. The cloth 12 in Fig. II fits pliably upon the whole end of the cake 10 with like effect. It also forms the deepest hollow at the point of pressure, thereby keeping the water and all heavy particles in it always at the rubbing-point. When the ink is sufficiently black, it may be run into the ink-well 9 by placing a finger under the dish 8 and raising the cloth until the ink flows through the passage 11.

In course of time the ink in the well naturally becomes by evaporation too thick for service. Then, after adding the required amount of water, it may be again reduced to fluidity by pressing the lower end of the well together between thumb and finger and rubbing a little. If not black enough, the ink in the well may be returned to the dish 8 by raising the lower end of the well until its contents flow through passage 11. Then more ink may be rubbed into it.

Under proper conditions, it is believed that this method of reducing ink from cake form to fluid does not grind off granular particles of ink which would require subsequent reduction to become fluid, but that it rubs from the cake only the ink already dissolved in the water, which accounts for the extreme fluidity of the ink thus produced. Its rapidity of action is accounted for on the same ground that all the ink removed from the cake has given its color to the water, and on the further ground that the pliable surface of the rubber acts evenly and in perfect contact with the whole end of the cake. There are doubtless many other uses to which this pliable, yielding, cushion-like grinding-surface may be adapted—such, for example, as scouring the surface of grain, grinding grain, middlings, &c., and completing the pulverization of precious ores. In all such cases two grinding-surfaces would be required, between which the material to be ground would pass. A common form of such surfaces is shown in Fig. IV, in which the cylinder 13 and the concave 14 are the grinding-surfaces, one or both of which may be of the yielding cushion-like character described. Any grinding-stone has a surface filled with fine pits, and the fineness of these pits decides the degree of fineness of the stone. In these pits grains may lodge and pass between the stones without further reduction; but my elastic grinding-surfaces will receive grains buried by indentation into them and continue to push such grains outward against the opposing grinder until the grains are reduced to extreme fineness.

I am aware that a cushion of piled leather or similar yielding material has been placed close to a grindstone as a rest on which axes and other heavy tools are held to be sharpened by the grindstone. I am also aware that buff-wheels for grinding and polishing tools, &c., with emery have been covered with leather, upon which the emery was glued, the leather being of a cushion-like character; and I am further aware that razor-strops are made with a cushion-like grinding-surface; but in all these cases of tool-grinding the object has been to change the shape of the tool regardless of the granular material removed therefrom. The material thus ground off from tools, &c., is a waste product, and no cognizance is taken either of its degree of fineness or fluidity. A grindstone and a cushion-rest would not be a suitable means for reducing india-ink to fluid; neither would a razor-strop, as heretofore, used dry, and if it were to be wet it would be a new and probably impracticable device for sharpening a razor. I am not aware that anything granular has before been passed between two grinding-surfaces, one or both of which was flexible or yielding, cushion-like; nor that a single such yielding cushion-like or flexible surface has ever before been adapted to reduce granular material to fluidity or to an extreme degree of fineness.

Having thus fully described my invention, what I believe to be new, and desire to secure by Letters Patent, is the following:

1. The combination of an annular frame and a sheet of flexible material secured thereon, and shaped as a grinding-dish therein and having the impervious character described.

2. The combination of an annular frame and a sheet of flexible material thereon formed into two dishes, one of which is a grinding-surface and the other an ink-well, substantially as shown and described.

3. The combination of an annular frame and a sheet of flexible material thereon formed into two dishes, and a channel connecting them, substantially as shown and described.

4. An ink-grinding slab of flexible impervious material shaped in dish form, substantially as shown and described.

In testimony whereof I affix my signature in presence of two witnesses.

WILLIAM X. STEVENS.

Witnesses:
WM. L. SPEIDEN,
EDGAR SPEIDEN, Jr.